(12) United States Patent  (10) Patent No.: US 7,528,709 B1
Maggiora  (45) Date of Patent: May 5, 2009

(54) SEATBELT STATUS INDICATOR SYSTEM

(76) Inventor: Norberto D. Maggiora, 411 S. Paloma Pl., Tampa, FL (US) 33609

( * ) Notice: Subject to any disclaimer, the term of this patent is extended or adjusted under 35 U.S.C. 154(b) by 0 days.

(21) Appl. No.: 11/906,272

(22) Filed: Oct. 1, 2007

Related U.S. Application Data

(60) Provisional application No. 60/858,906, filed on Nov. 14, 2006.

(51) Int. Cl.
*B60Q 1/00* (2006.01)
(52) U.S. Cl. .................... 340/457.1; 340/468
(58) Field of Classification Search ............. 340/457.1, 340/468
See application file for complete search history.

(56) References Cited

U.S. PATENT DOCUMENTS

| | | | |
|---|---|---|---|
| 3,718,902 A | 2/1973 | Pearsall | |
| RE28,804 E | 5/1976 | Sardo | |
| 4,849,733 A * | 7/1989 | Conigliaro et al. | 340/457.1 |
| 6,059,066 A * | 5/2000 | Lary | 180/268 |
| 6,215,395 B1 * | 4/2001 | Slaughter et al. | 340/457.1 |
| 6,545,597 B1 * | 4/2003 | Blount | 340/425.5 |
| 6,774,781 B1 * | 8/2004 | Lee | 340/468 |
| 2003/0137411 A1 * | 7/2003 | Hagenbuch | 340/457.1 |
| 2005/0156726 A1 * | 7/2005 | Rubel | 340/457.1 |

* cited by examiner

*Primary Examiner*—Daniel Wu
*Assistant Examiner*—John F Mortell

(57) ABSTRACT

A light is positionable on a rear of a vehicle and a source of electrical potential. Electrical lines with a flasher couple the light and the source of electrical potential. A latchable seatbelt with a buckle and a seatbelt switch is coupled to the light and the source of electrical potential. The seatbelt switch constitutes an open electrical switch when not latched. The seatbelt switch constitutes a closed electrical switch when the seatbelt is latched. The seatbelt when latched functions with the source of potential to configure the light in a first continuously illuminated manner. The seatbelt when not latched functions to configure the light in a second flashing manner.

3 Claims, 3 Drawing Sheets

SEATBELT STATUS INDICATOR SYSTEM

RELATED APPLICATION

The present application is based upon Provisional Patent Application Ser. No. US60/858,906 filed Nov. 14, 2006, the subject matter of which is incorporated herein by reference and the priority of which is claimed hereby.

BACKGROUND OF THE INVENTION

1. Field of the Invention

The present invention relates to a seatbelt status indicator system and more particularly pertains to insuring the use of vehicle seatbelts in a safe, convenient and economical manner.

2. Description of the Prior Art

Many fatalities occur each year because vehicle drivers and passengers are not wearing seatbelts. A driver who is impaired is even less likely to wear a seatbelt thereby further enhancing the opportunity for a serious injury or fatality. Accordingly, there is currently a need for a device that immediately alerts nearby law enforcement whenever a driver or passenger is not wearing a seatbelt. The present invention addresses this need by providing a signal light positioned on the rear end of the vehicle that is continuously illuminated if the driver's seatbelt and passenger's seatbelt are properly fastened.

The use of seatbelt systems of known designs and configurations is known in the prior art. More specifically, seatbelt systems of known designs and configurations previously devised and utilized for the purpose of using seatbelts through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,718,902 issued Feb. 27, 1973 to Pearsall and relates to a Vehicle Seat Belt Alarm and Starter Interlock Control System and U.S. Pat. No. Re. 28,804 issued May 4, 1976 to Sardo relates to a Seat Belt System for Automotive Vehicles.

While these devices fulfill their respective, particular objectives and requirements, the aforementioned patents do not describe a seatbelt status indicator system that allows for insuring the use of vehicle seatbelts in a safe, convenient and economical manner.

In this respect, the seatbelt status indicator system according to the present invention substantially departs from the conventional concepts and designs of the prior art, and in doing so provides an apparatus primarily developed for the purpose of insuring the use of vehicle seatbelts in a safe, convenient and economical manner.

Therefore, it can be appreciated that there exists a continuing need for a new and improved seatbelt status indicator system which can be used for insuring the use of vehicle seatbelts in a safe, convenient and economical manner. In this regard, the present invention substantially fulfills this need.

SUMMARY OF THE INVENTION

In view of the foregoing disadvantages inherent in the known types of seatbelt systems of known designs and configurations now present in the prior art, the present invention provides an improved seatbelt status indicator system. As such, the general purpose of the present invention, which will be described subsequently in greater detail, is to provide a new and improved seatbelt status indicator system and method which has all the advantages of the prior art and none of the disadvantages.

The seatbelt status indicator for a vehicle of the present invention includes a signal light positioned on the rear end of the vehicle. The light is electrically connected to the vehicle's battery via a relay and a ground contact within both the driver's seatbelt latch receptacle and passenger's seatbelt latch receptacle. The light is alternatively connected to the battery via the relay, a diode and a flasher circuit. Accordingly, when both seatbelt latches are properly positioned within their respective latch receptacles, each latch forces the ground contact into engagement with a grounded cable. Accordingly, the light is continuously illuminated to alert nearby law enforcement personnel that the driver and passenger are, in fact, wearing a seatbelt. If either seatbelt latch is not properly fastened within its corresponding latch receptacle, proper grounding is disabled and current no longer flows to the relay. The relay then activates the flashing circuit and diode, which pulses the light to notify a law enforcement officer that the driver and/or passenger is not wearing a seatbelt.

More specifically, the present invention essentially comprises a seatbelt status indicator system. First provided is a vehicle. The vehicle has an interior. The vehicle has an exterior. The vehicle also has a front. The vehicle further has a back.

A light is provided. The light is centrally positioned on the exterior at the back of the vehicle.

Provided next is a battery. The battery is positioned within the interior adjacent to the front of the vehicle. The battery has an anode. The battery has a cathode. The anode and cathode are operatively coupled with the light. In this manner a source of electrical potential is provided. Further in this manner the light is illuminated.

A positive electrical line is provided. The positive electrical line couples the cathode with the light. A negative electrical line is provided. The negative electrical line couples the anode with the light.

A relay is provided next. The relay is provided in the positive electrical line at an intermediate extent of the positive electrical line. A crossing electrical line is provided. The crossing electrical line couples the relay and the negative electrical line at an intermediate extent of the negative electrical line.

Further provided is an intermediate electrical line. The intermediate electrical line is provided in parallel with the positive and negative electrical lines. The intermediate electrical line couples the relay and the light. The intermediate electrical line includes a flasher circuit. The intermediate electrical line includes a diode. The flasher circuit and diode are provided in series along the intermediate electrical line.

Provided last is a latchable passenger seatbelt. The passenger seatbelt has a passenger seatbelt switch in the crossing electrical line. A latchable driver seatbelt with a driver seatbelt switch is also provided. The seatbelt switches are provided in the crossing electrical line. The passenger and driver seatbelt switches are in series along the crossing electrical line. Each seatbelt switch constitutes an open switch when the seatbelt is not latched. Each seatbelt switch constitutes a closed switch when the seatbelt is latched. Each of the seatbelt switches also includes a ground line. In this manner the circuit is completed. The battery and light are operable in association with the relay and flasher circuit and diode in combination with the seatbelt switches. In this manner the light is illuminated in a continuous manner when both seatbelt switches are closed and the vehicle is operating. Also in this manner the light is illuminated in a flashing manner when both seatbelt switches are open and the vehicle is operating. Further in this manner the light is not illuminated when the vehicle is not operating.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved seatbelt status indicator system which has all of the advantages of the prior art seatbelt systems of known designs and configurations and none of the disadvantages.

It is another object of the present invention to provide a new and improved seatbelt status indicator system which may be easily and efficiently manufactured and marketed.

It is further object of the present invention to provide a new and improved seatbelt status indicator system which is of durable and reliable constructions.

An even further object of the present invention is to provide a new and improved seatbelt status indicator system which is susceptible of a low cost of manufacture with regard to both materials and labor, and which accordingly is then susceptible of low prices of sale to the consuming public, thereby making such seatbelt status indicator system economically available to the buying public.

Even still another object of the present invention is to provide a seatbelt status indicator system for insuring the use of vehicle seatbelts in a safe, convenient and economical manner.

It is another an object of the present invention to encourage drivers to wear seatbelts.

It is another object of the present invention to conspicuously alert law enforcement personnel if a driver is not wearing a seatbelt.

Lastly, it is an object of the present invention to provide a new and improved seatbelt status indicator system. A light is positionable on a rear of a vehicle with a source of electrical potential. Electrical lines with a flasher couple the light and the source of electrical potential. A seatbelt with a buckle and a seatbelt switch are coupled to the light and the source of electrical potential. The seatbelt switch constitutes an open electrical switch when the seatbelt is not latched. The seatbelt switch constitutes a closed electrical switch when the seatbelt is latched. The seatbelt switch when closed functions with the source of potential to configure the light in a first continuously illuminated manner. The seatbelt switch when open functions to configure the light in a second flashing manner.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated the primary and preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures for this primary and preferred embodiment of the invention.

DESCRIPTION OF THE PREFERRED EMBODIMENT

Figure 1:
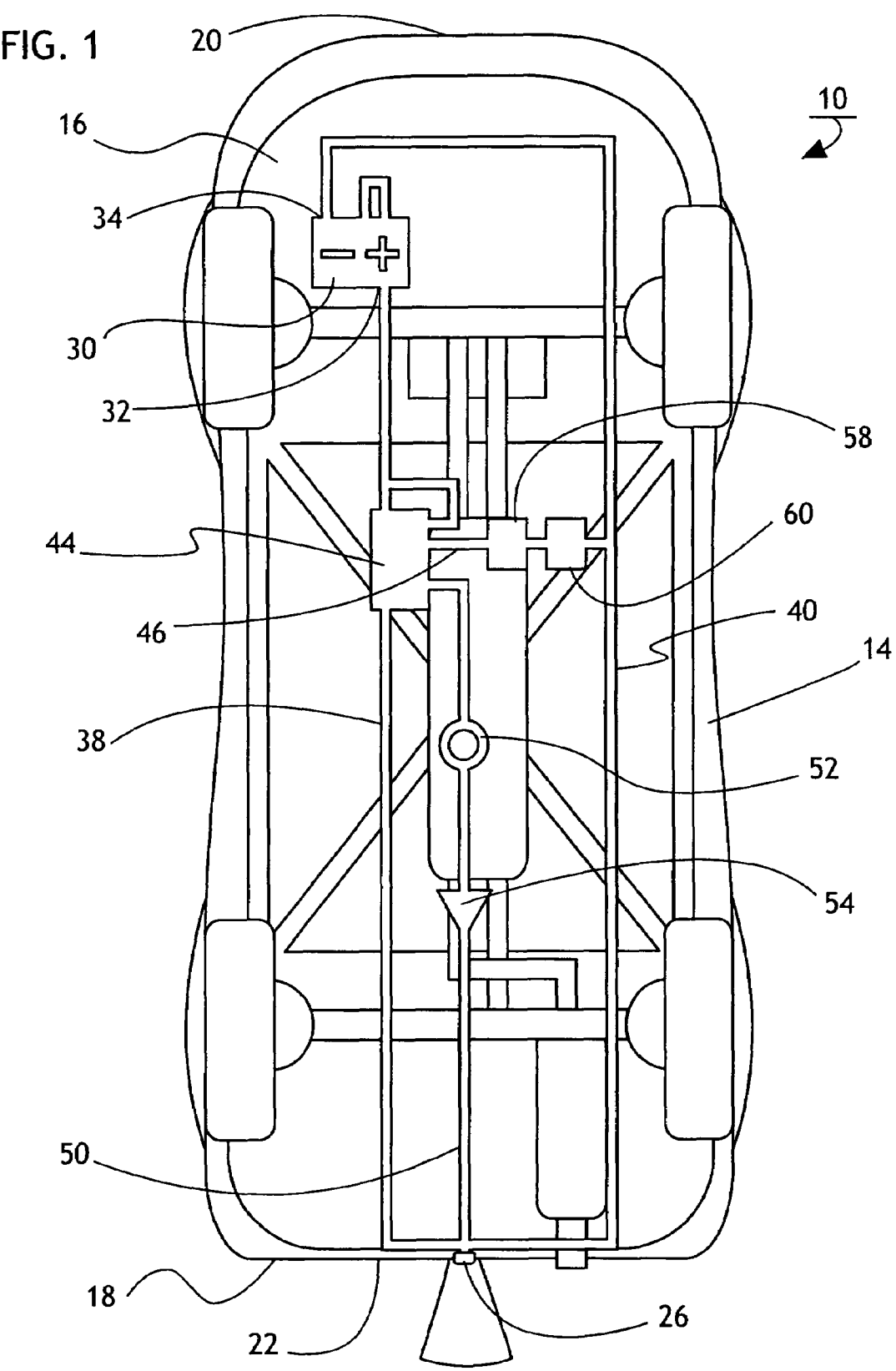
FIG. 1 is a bottom view of a seatbelt status indicator system constructed in accordance with the principles of the present invention.
Figure 2:
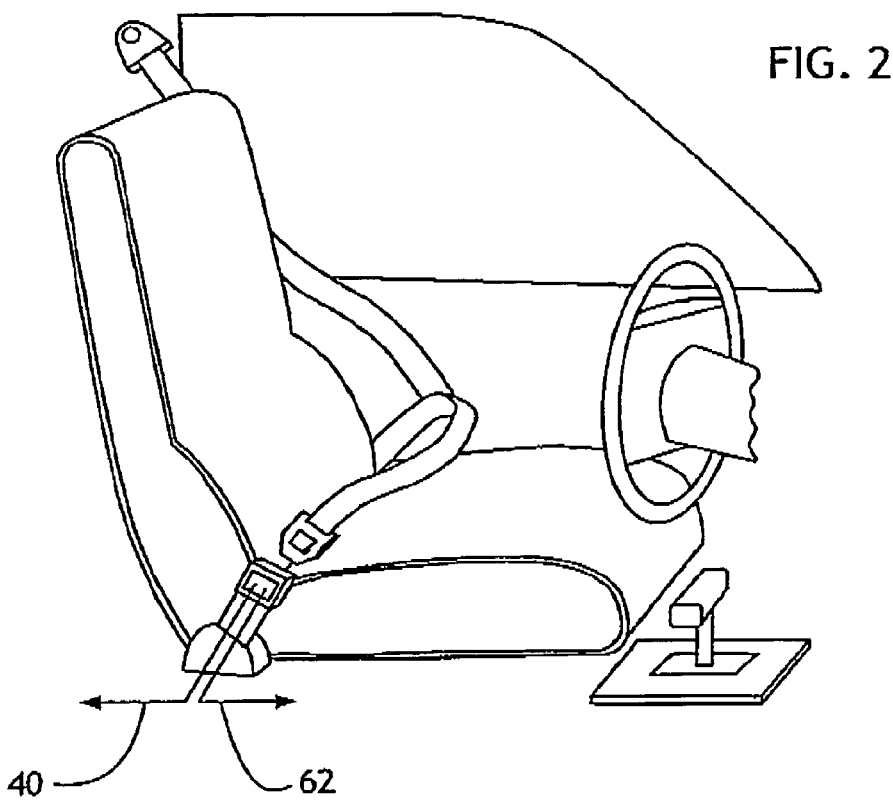
FIG. 2 is a perspective illustration of a driver seat and seatbelt of the system shown in FIG. 1.
Figure 3:
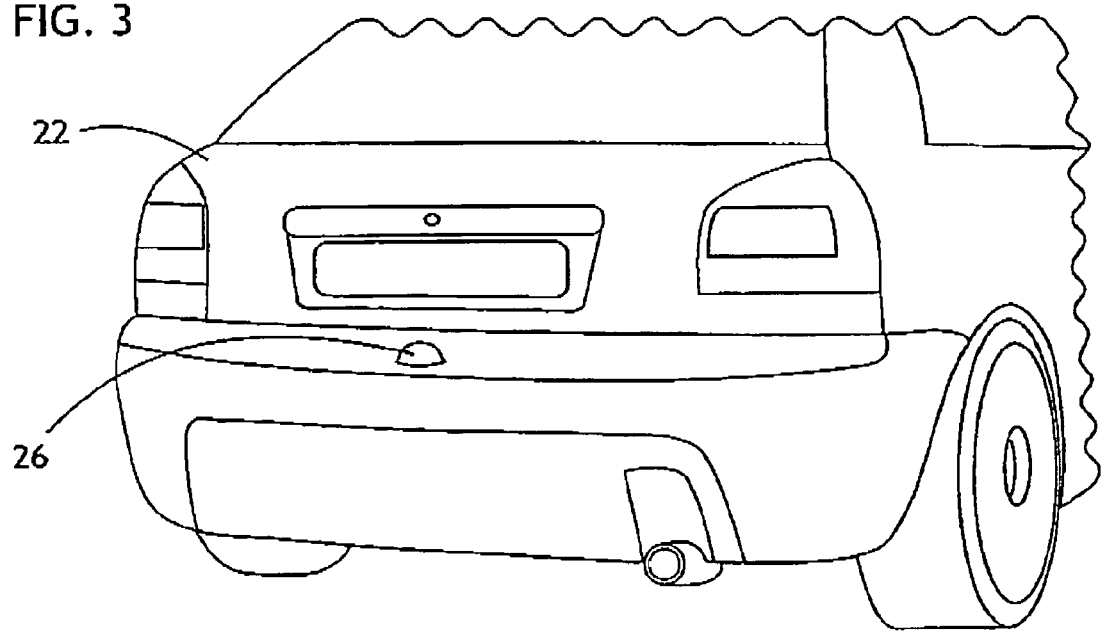
FIG. 3 is a perspective illustration of a car rear of the system shown in FIG. 1.
Figure 4:
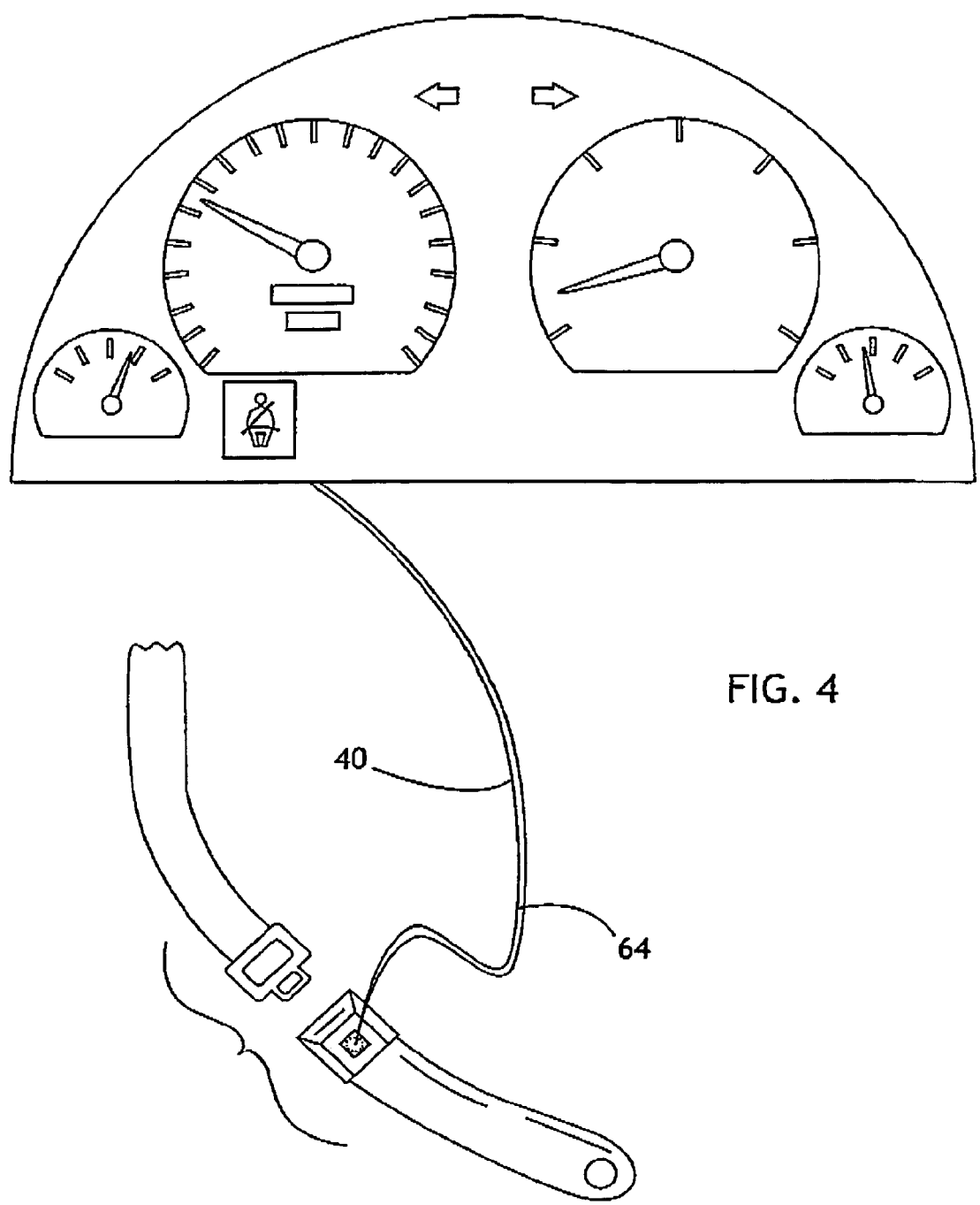
FIG. 4 is a perspective illustration of a dashboard and passenger seatbelt of the system shown in FIG. 1.

With reference now to the drawings, and in particular to FIG. 1 thereof, the preferred embodiment of the new and improved seatbelt status indicator system embodying the principles and concepts of the present invention and generally designated by the reference numeral 10 will be described.

The present invention, the seatbelt status indicator system 10 is comprised of a plurality of components. Such components in their broadest context include a light, electrical lines and a seatbelt. Such components are individually configured and correlated with respect to each other so as to attain the desired objective.

First provided is a vehicle 14. The vehicle has an interior 16. The vehicle has an exterior 18. The vehicle also has a front 20. The vehicle further has a back 22.

A light 26 is provided. The light is centrally positioned on the exterior at the back of the vehicle.

Provided next is a battery 30. The battery is positioned within the interior adjacent to the front of the vehicle. The battery has an anode 32. The battery has a cathode 34. The anode and cathode are operatively coupled with the light. In this manner a source of electrical potential is provided. Further in this manner the light is illuminated.

A positive electrical line 38 is provided. The positive electrical line couples the anode with the light. A negative electrical line 40 is provided. The negative electrical line couples the cathode with the light.

A relay 44 is provided next. The relay is provided in the positive electrical line at an intermediate extent of the positive electrical line. A crossing electrical line 46 is provided. The crossing electrical line couples the relay and the negative electrical line at an intermediate extent of the negative electrical line.

Further provided is an intermediate electrical line 50. The intermediate electrical line is provided in parallel with the positive and negative electrical lines. The intermediate electrical line couples the relay and the light. The intermediate electrical line includes a flasher circuit 52. The intermediate electrical line includes a diode 54. The flasher circuit and diode are provided in series along the intermediate electrical line.

Provided last is a latchable passenger seatbelt. The passenger seatbelt has a passenger seatbelt switch 60 in the crossing electrical line. A latchable driver seatbelt with a driver seatbelt switch 58 is also provided. The seatbelt switches are provided in the crossing electrical line. The passenger and driver seatbelt switches are in series along the crossing electrical line. Each seatbelt switch constitutes an open switch when the seatbelt is not latched. Each seatbelt switch constitutes a closed switch when the seatbelt is latched. Each of the seatbelt switches also include a ground line 62, 64. In this manner the circuit is completed. The battery and light are operable in association with the relay and flasher circuit and diode in combination with the seatbelt switches. In this manner the light is illuminated in a continuous or first manner when both seatbelt switches are closed and the vehicle is operating. Also in this manner the light is illuminated in a flashing or second manner when both seatbelt switches are open and the vehicle is operating. Further in this manner the light is not illuminated when the vehicle is not operating.

From the above descriptions, it may be understood that the present invention relates to a seatbelt status indicator for a vehicle. The device comprises a light preferably positioned on the rear of the vehicle immediately beneath the license tag. The light is electrically connected to the positive terminal of the vehicle battery and a relay. The negative terminal of the vehicle battery is electrically connected to a grounding mechanism and the light. The ground mechanism includes a contact positioned with in the seatbelt latch receptacle that is connected to the negative terminal of the battery. Adjacent the contact is a grounded cable that is anchored to an appropriate position on the vehicle chassis. Preferably, a contact and grounded cable are included in both the driver's seatbelt latch receptacle and the passenger's seatbelt latch receptacle.

The light circuit also includes a flashing circuit and a diode that are energized by the relay. When both the driver's seatbelt and the passenger's seatbelt are properly fastened, each contact within its respective latch receptacle is moved into engagement with the cable thereby grounding the circuit. Accordingly, current flows directly to the light resulting in its continuous illumination. If either seatbelt is unfastened, the direct circuit path is no longer grounded causing the relay to divert current through the diode and flashing circuit, which pulse or flash the light. Accordingly, a continuously illuminated light will alert nearby law enforcement personnel that the vehicle driver and passenger are wearing a seatbelt. If the light is pulsing or flashing, law enforcement is alerted that the driver and/or passenger is not wearing a seatbelt thereby affording the requisite probable cause to stop the driver and investigate. If the light is completely disabled, law enforcement is notified that the light requires replacement or has been tampered with. In either case, the law enforcement officer can choose to stop the driver if desired.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A seatbelt status indicator system comprising:
   a light positionable on a vehicle and a source of electrical potential;
   electrical lines coupling the light and the source of electrical potential;
   two latchable seatbelts, each with a buckle and a seatbelt switch coupled to the light and the source of electrical potential;
   the electrical lines including a positive electrical line coupling the source of potential with the light and a negative electrical line coupling the source of potential with the light and a crossing electrical line coupling the positive and the negative electrical lines and an intermediate electrical line in parallel with the positive and negative electrical lines coupling the positive and crossing lines with the light; and
   a relay between the positive and crossing lines and a flasher circuit and a diode in series in the intermediate electrical line and with the two seatbelt switches in the crossing line.

2. The system as set forth in claim 1 wherein each seatbelt switch constitutes a closed switch when the seatbelts are latched, the source of electrical potential and light being operable in association with the relay and flasher circuit and diode in combination with the seatbelt switches to thereby illuminate the light in a continuous manner when both seatbelt switches are latched and the vehicle is operating, and to thereby illuminate the light in a flashing manner when both seatbelt switches are not latched and the vehicle is operating, and to thereby not illuminate the light when the vehicle is not operating.

3. A seatbelt status indicator system for insuring the use of vehicle seatbelts in a safe, convenient and economical manner comprising, in combination:
   a vehicle having an interior and an exterior with a front and a back;
   a light centrally positioned on the exterior at the back of the vehicle;
   a battery positioned within the interior adjacent to the front of the vehicle, the battery having an anode and a cathode operatively coupled with the light for providing a source of electrical potential to illuminate the light;
   a positive electrical line coupling the cathode with the light and a negative electrical line coupling the anode with the light;
   a relay in the positive electrical line at an intermediate extent of the positive electrical line with a crossing electrical line coupling the relay and the negative electrical line at an intermediate extent of the negative electrical line;
   an intermediate electrical line in parallel with the positive and negative electrical lines and coupling the relay and the light, the intermediate electrical line including a flasher circuit and a diode in series along the intermediate electrical line; and a latchable passenger seatbelt with a passenger seatbelt switch in the crossing electrical line and a latchable driver seatbelt with a driver seatbelt switch in the crossing electrical line, the passenger and driver seatbelt switches being in series along the crossing electrical line, each seatbelt switch constituting an open switch when the seatbelt is not latched, each seatbelt switch constituting a closed switch when the seatbelt is latched, each of the seatbelt switches also including a ground line for completing its circuit, the battery and light being operable in association with the relay and flasher circuit and diode in combination with the seatbelt switches to thereby illuminate the light in a continuous manner when both seatbelt switches are closed and the vehicle is operating, and to thereby illuminate the light in a flashing manner when both seatbelt switches are open and the vehicle is operating, and to thereby not illuminate the light when the vehicle is not operating.

\* \* \* \* \*